(12) United States Patent
Maldaner

(10) Patent No.: US 9,052,953 B2
(45) Date of Patent: Jun. 9, 2015

(54) AUTONOMOUS COMPUTER SESSION CAPACITY ESTIMATION

(75) Inventor: Juliano Maldaner, Cupertino, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 458 days.

(21) Appl. No.: 13/478,710

(22) Filed: May 23, 2012

(65) Prior Publication Data

US 2012/0303800 A1 Nov. 29, 2012

Related U.S. Application Data

(60) Provisional application No. 61/489,240, filed on May 23, 2011.

(51) Int. Cl.
*G06F 15/173* (2006.01)
*G06F 9/50* (2006.01)
*H04L 12/26* (2006.01)

(52) U.S. Cl.
CPC .......... *G06F 9/5011* (2013.01); *H04L 43/0876* (2013.01); *H04L 43/16* (2013.01); *G06F 9/5077* (2013.01)

(58) Field of Classification Search
CPC . G06F 9/5011; G06F 9/5077; H04L 43/0876; H04L 43/16
USPC .................................... 709/223, 224; 718/1
See application file for complete search history.

(56) References Cited

U.S. PATENT DOCUMENTS

| | | | |
|---|---|---|---|
| 8,209,695 B1* | 6/2012 | Pruyne et al. .................. | 718/104 |
| 2005/0091363 A1* | 4/2005 | McCormick et al. ......... | 709/224 |
| 2005/0251808 A1* | 11/2005 | Gbadegesin et al. ......... | 719/310 |
| 2006/0143617 A1* | 6/2006 | Knauerhase et al. ......... | 718/104 |
| 2008/0271039 A1* | 10/2008 | Rolia et al. ..................... | 718/105 |
| 2012/0089980 A1* | 4/2012 | Sharp et al. ....................... | 718/1 |
| 2013/0091543 A1 | 4/2013 | Wade et al. | |

* cited by examiner

*Primary Examiner* — Hee Soo Kim
(74) *Attorney, Agent, or Firm* — Banner & Witcoff, Ltd.

(57) ABSTRACT

Systems and methods are disclosed for estimating and updating the capacity associated with resources in a virtualized computing environment. A capacity estimation value may be stored in computer memory. The capacity estimation value may estimate how many concurrent sessions a resource in the virtualized computing environment has workload capacity to desirably handle. The system may monitor one or more resource consumption metrics of the resource on an ongoing basis. The capacity estimation value may be updated based on, inter alia, the monitoring. The capacity estimation value may be used when a request is received to create a new session in the resource.

19 Claims, 8 Drawing Sheets

AUTONOMOUS COMPUTER SESSION CAPACITY ESTIMATION

CROSS-REFERENCE TO RELATED APPLICATIONS

This application claims priority from U.S. Provisional Application Ser. No. 61/489,240, filed May 23, 2011, which is herein incorporated by reference in its entirety.

FIELD OF THE DISCLOSURE

This application generally relates to load balancing. In particular, this application relates to estimating computer session capacity to load balance sessions on a computer.

BACKGROUND OF THE DISCLOSURE

Providing end users with a virtualization environment can present load balancing challenges. Other load balancing systems fail to address all of these challenges. Systems designed to deliver a virtualized environment to an end user must load balance user load amongst the various physical machines included in those systems. There are many challenges associated with trying to forecast and plan for the amount of resources required by a particular user. At any point in time, a user could require more or less resources. When a system is overloaded or otherwise not properly load balanced, the system may be unable to provide a user with the required resources in a reasonable amount of time thereby decreasing an end user's user-experience.

It is often difficult to predict not only how much load a particular user may place on a virtualization system, but also how many users a physical computer or infrastructure can support. Systems can avoid being overloaded or otherwise not properly load balanced by avoiding overloading the physical machines of the systems with more users than the hardware of the physical machines can support. By avoiding overloading, the systems can ensure that resources are delivered to users in a prompt and reasonable amount of time such that the end-user experience is optimized.

There are many challenges with trying to achieve an optimally load balanced system. Some of these challenges stem from an administrator's inability to know to a reasonable degree of certainty the amount of load a particular user may place on a system at any given instance of time. While the administrator can know and control the number and type of users of a system, it is often difficult to know the amount of resources a user will require. Users exert load on a system by consuming any of the following resources: hardware; network; storage; CPU; memory; etc. Users many not consume these resources constantly but rather their consumption amounts and periods may vary as applications are updated, additional applications are installed, or user behavior changes. In many of the above instances, a user uses resources within a user session, thus estimating user load can include estimating the load placed on the system by a user session.

Challenges associated with determining how to estimate user session capacity or the load placed on a system by a user of a user session can be exacerbated when multiple user sessions or users share a common pool of hardware resources. In some instances, administrators can determine the amount of hardware allocated to each workload a priori. These challenges apply equally to systems where users or user sessions are dedicated to a particular set of hardware such that they cannot be moved from computer to computer, and in systems that include multiple sets of hardware (e.g. computers) but a single hypervisor pool such that users or user sessions can be moved from computer to computer, but cannot be moved outside of a dedicated hypervisor pool. In each of these instances, the user or user session experiences a user-mobility boundary such as a physical computer or hypervisor pool. The user or user session cannot execute outside of the user-mobility boundary and therefore is load balanced in relation to other users or user sessions having substantially the same user-mobility boundary.

SUMMARY OF THE DISCLOSURE

The following presents a simplified summary of the disclosure in order to provide a basic understanding of some aspects. It is not intended to identify key or critical elements of the disclosure or to delineate the scope of the disclosure. The following summary merely presents some concepts of the disclosure in a simplified form as a prelude to the more detailed description provided below.

This disclosure describes methods and systems for estimating a user session's capacity based on historic utilization data. The methods and systems include estimating capacity using one of three different methods. The first method includes using a capacity estimation based on averages associated with a group of computers or a group of user-mobility-boundary components. The second method includes using typical utilization values as an estimate for capacity. The third method includes using an actual capacity value to estimate capacity.

In another embodiment in accordance with aspects of the disclosure, an apparatus is disclosed comprising a computer processor, memory, and/or an interface. In an alternate embodiment the computer memory may be wholly or partially located in a data storage system. One skilled in the art will appreciate that one or more of the aforementioned methods and features may be embodied as computer-executable instructions stored on a tangible computer-readable medium and executed by a processor in an apparatus.

BRIEF DESCRIPTION OF THE DRAWINGS

The following figures depict certain illustrative embodiments of the methods and systems described herein, in which like reference numerals refer to like elements. These depicted embodiments are to be understood as illustrative of the disclosed methods and systems and not as limiting in any way.

DETAILED DESCRIPTION OF THE DRAWINGS

Systems and methods are disclosed for estimating and updating the capacity associated with resources in a virtualized computing environment. A capacity estimation value may be stored in computer memory. The capacity estimation value may estimate how many concurrent sessions a resource in the virtualized computing environment has workload capacity to desirably handle. The system may monitor one or more resource consumption metrics of the resource on an ongoing basis. The capacity estimation value may be updated based on, inter alia, the monitoring. The capacity estimation value may be used when a request is received to create a new session in the resource.

Overview of Illustrative Computing Environment.

Figure 1A:
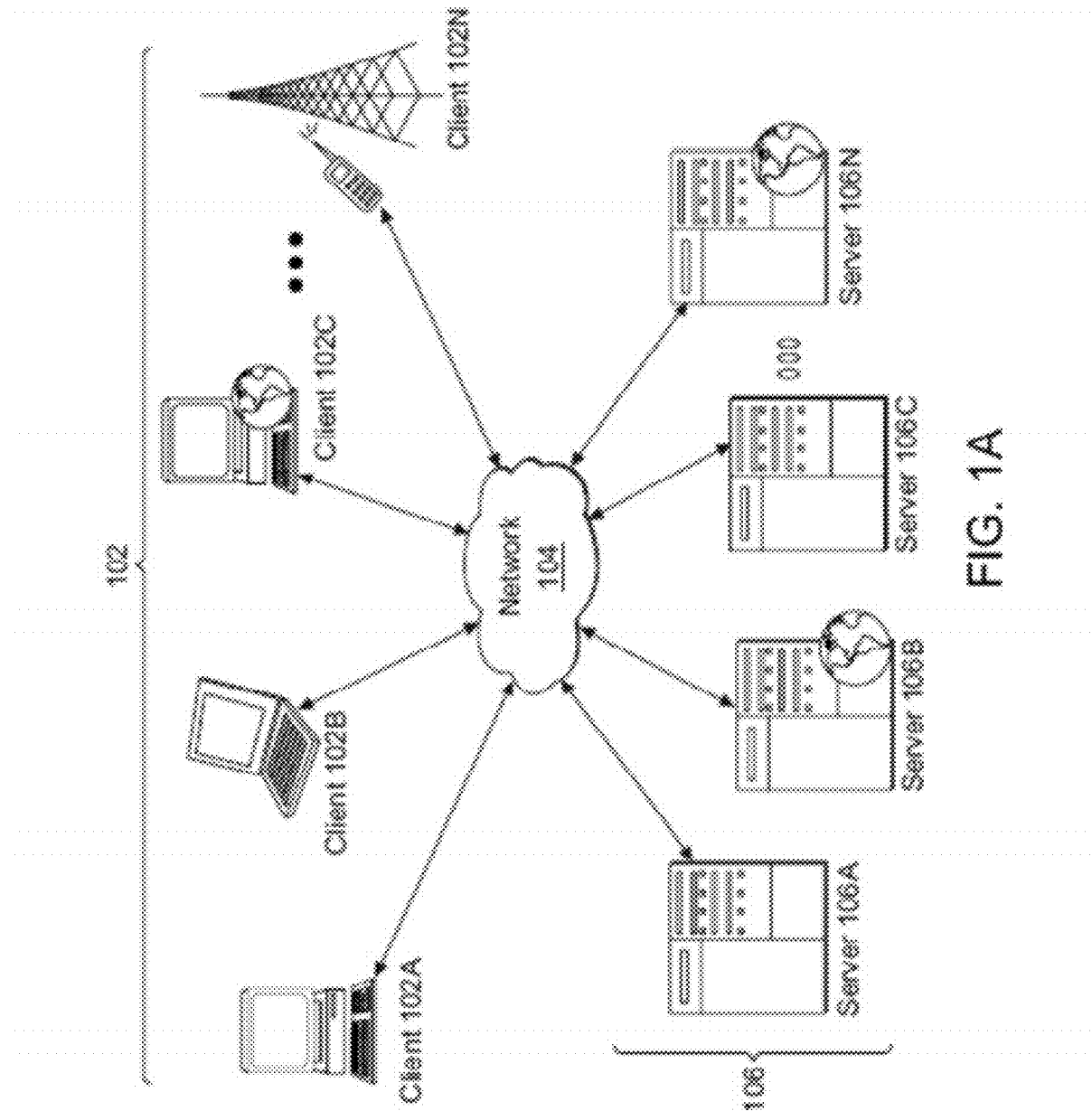
FIG. 1A depicts embodiments of network environments that provide remote access to computing devices that can execute application programs.

FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can manage client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems (e.g., Xen hypervisor), IBM, VMware, Microsoft (e.g., Hyper-V), EMC (e.g., ESX) or any other hypervisor. In other embodiments, the virtual machine 102C can be managed by any hypervisor, while in still other embodiments, the virtual machine 102C can be managed by a hypervisor executing on a server 106 or a hypervisor executing on a client 102. In various embodiments in accordance with this disclosure, a hypervisor may be an abstraction layer that supports running multiple instances of operating systems, each of which may be a virtual machine. One of those virtual machines may manage the physical device on which the hypervisor is executing. In some examples, each of these virtual machines may be optionally referred to as "domains," and the management domain may be referred to as "Dom 0" or "Domain 0".

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory;

or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
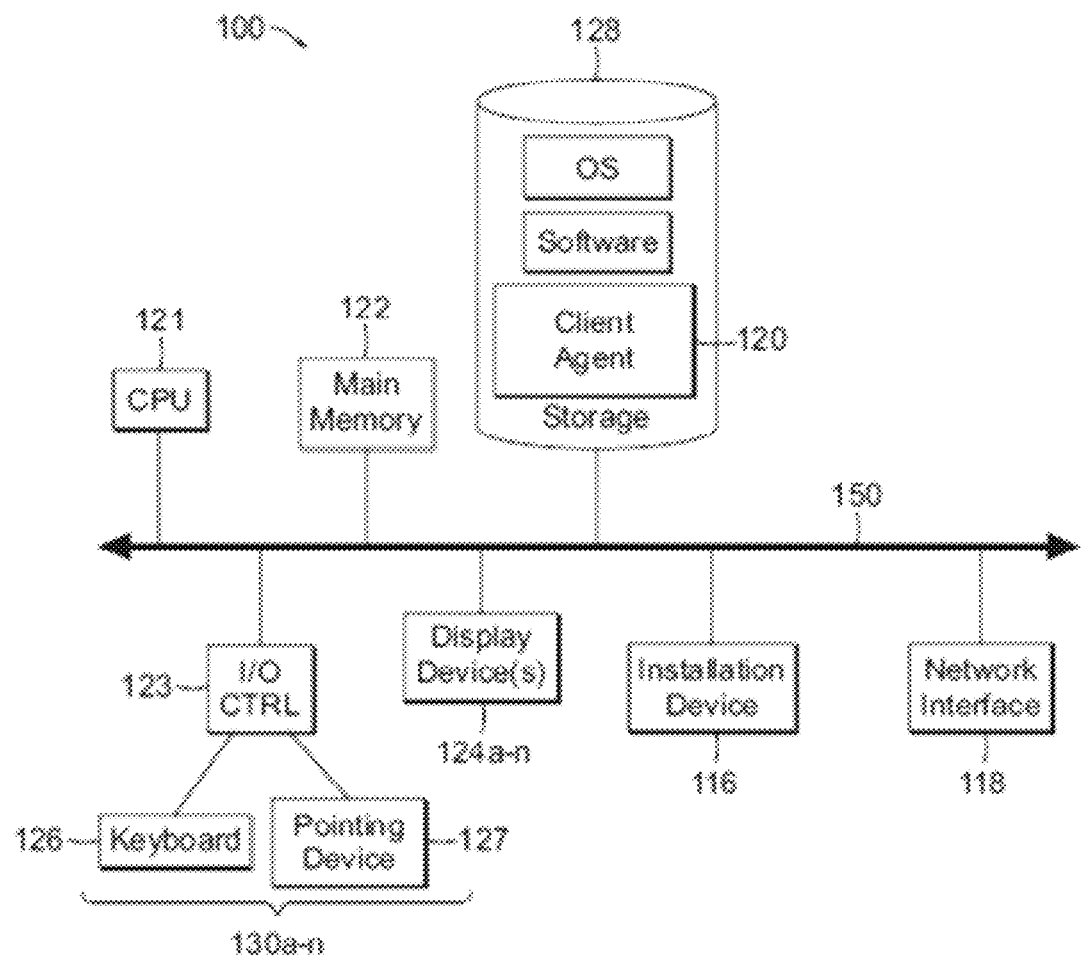
FIG. 1B and FIG. 1C are block diagrams that depict embodiments of computing devices.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
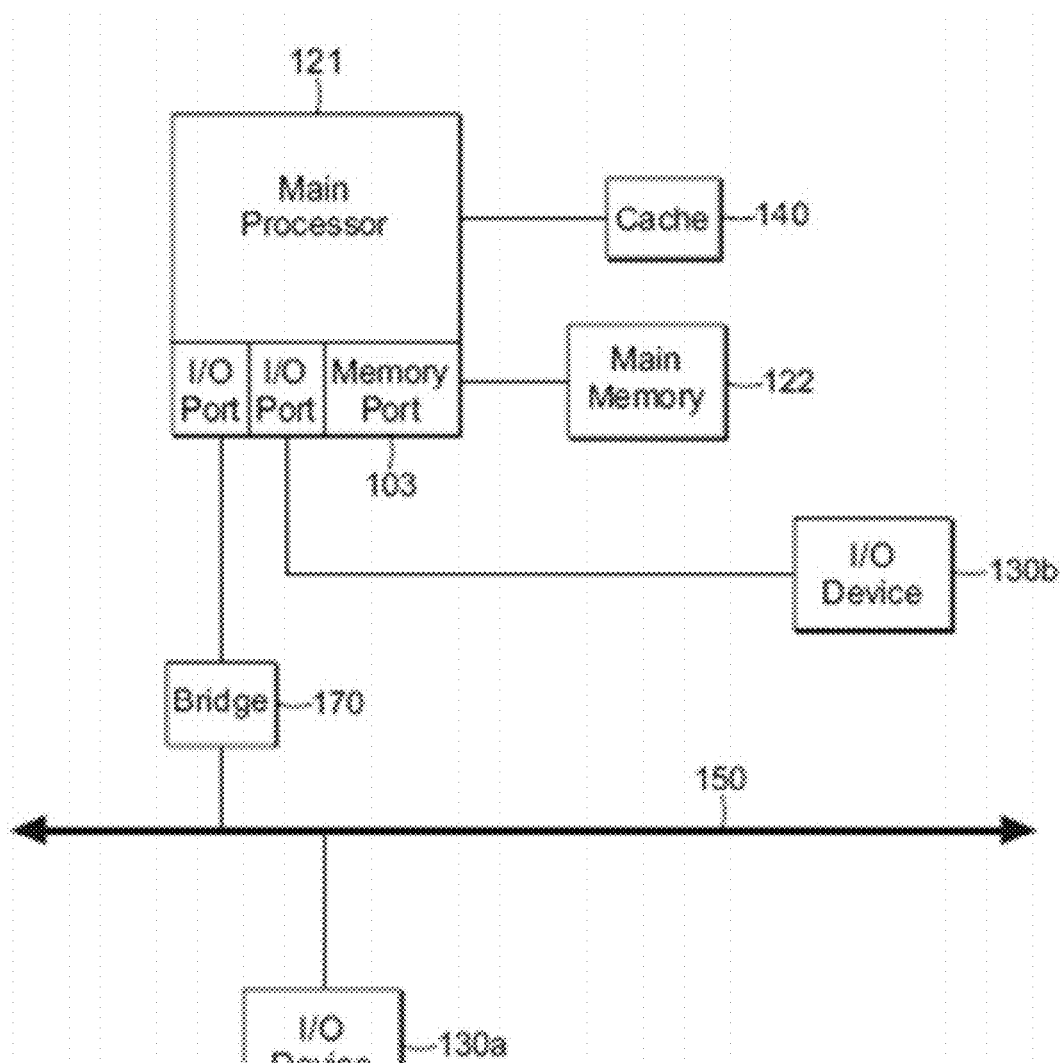

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121, may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (PRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a boatable medium, a boatable CD, a boatable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

Virtualization Environment Overview.

Figure 2A:
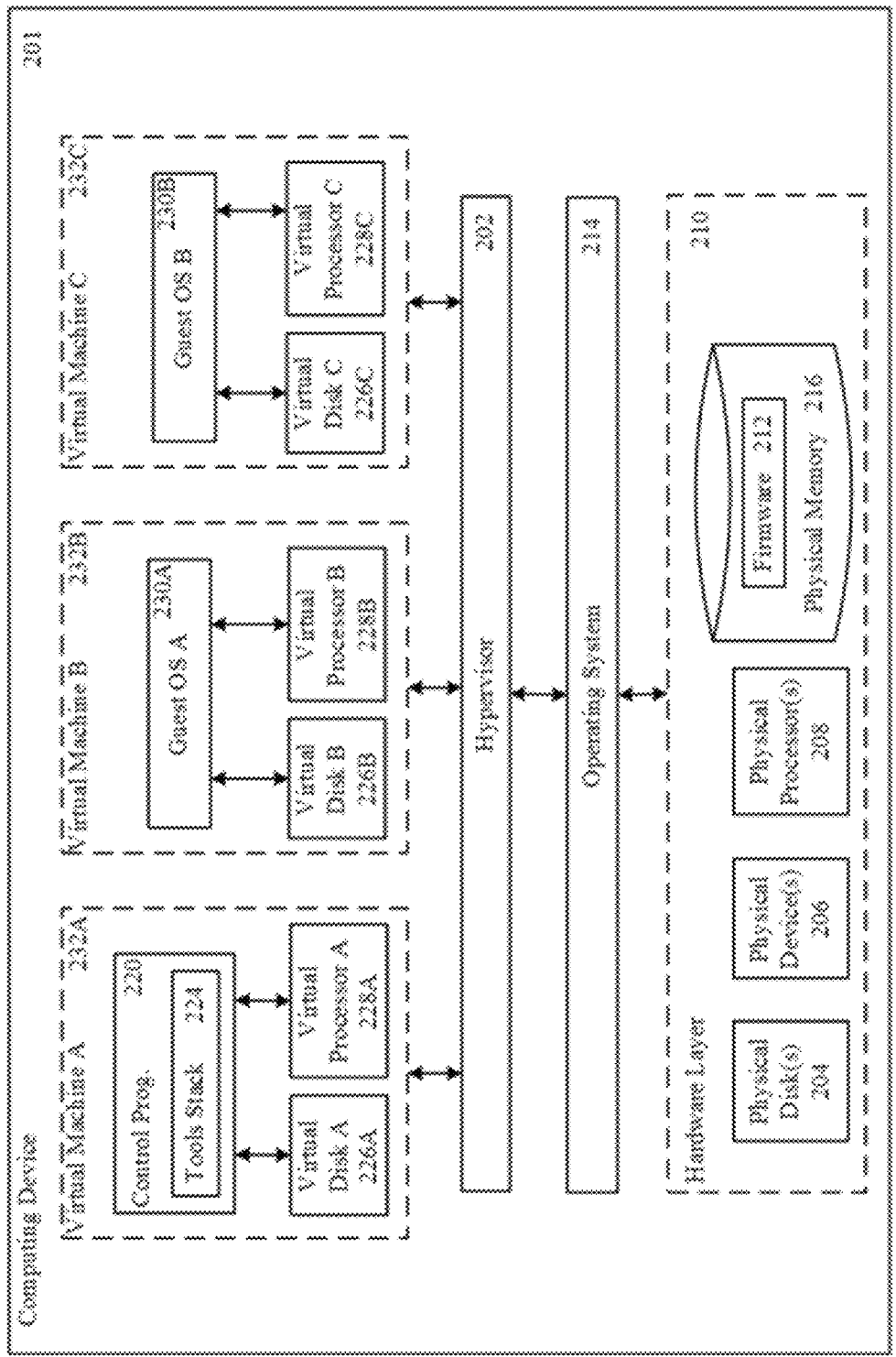
FIG. 2A and FIG. 2B are block diagrams that depict embodiments of a virtualization environment.

Illustrated in FIG. 2A is one embodiment of a virtualization environment. Included on a computing device 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The computing device 201 can further include an operating system 214 that can be stored in a memory element in the physical memory 216 and executed by one or more of the physical processors 208. Still further, a hypervisor 202 can be stored in a memory element in the physical memory 216 and can be executed by one or more of the physical processors 208. Executing on one or more of the physical processors 208 can be one or more virtual machines 232A-C (generally 232). Each virtual machine 232 can have a virtual disk 226A-C and a virtual processor 228A-C. In some embodiments, a first virtual machine 232A can execute, on a virtual processor 228A, a control program 220 that includes a tools stack 224. In other embodiments, one or more virtual machines 232B-C can executed, on a virtual processor 228B-C, a guest operating system 230A-B.

Further referring to FIG. 2A, and in more detail, in one embodiment the virtualization environment described includes a Type 2 hypervisor 202, or a hypervisor that executes within an operating system 214 executing on the computing device 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system.

In some embodiments, the virtualization environment includes a computing device 201. The computing device 201 can be any computing device, and in some embodiments the computing device 201 can be any computer, device or computing machine described herein. While FIG. 2A illustrates a single computing device 201, in some embodiments the modules, programs, virtual machines, and commands stored and executed by the computing device 201 can be executed by more than one computing device 201. In still other embodiments, the computing device 201 can be a server farm.

In one embodiment, the computing device 201 can include a hardware layer 210 that includes one or more pieces of hardware that communicates with the computing machine 201. In some embodiments, the hardware layer 210 can include any hardware included in the computing device 201. In other embodiments, the hardware layer 210 can include one or more physical disks 204, one or more physical devices 206, one or more physical processors 208 and memory 216.

The hardware layer 210, in some embodiments, can include one or more physical disks 204. A physical disk 204 can be any hard disk, while in some embodiments a physical disk 204 can be any hard disk described herein. In some embodiments, the hardware layer 210 can include one physical disk 204. In other embodiments, the hardware layer 210 can include more than one physical disk 204. The computing device 201, in some embodiments, can communicate with an external hard disk that is included in the hardware layer 210 as a physical disk 204.

In other embodiments, the hardware layer 210 can include a processor 208. The processor 208, in some embodiments, can be any processor, while in other embodiments the processor 208 can be any processor described herein. The processor 208 can include one or more processing cores. In other embodiments the computing device 201 can include one or more processors 208. In some embodiments, the computing device 201 can include one or more different processors, e.g. a processing unit, a graphics processing unit, or a physics engine.

Physical devices 206, in some embodiments, can be any device included in the computing device 201. In some embodiments, physical devices 206 can be any combination of devices included in the computing device 201 and external devices that communicate with the computing device 201. The computing device 201, in some embodiments, can include one or more physical devices 206. A physical device 206 can be any of the following: a network interface card; a video card; a keyboard; a mouse; an input device; a monitor; a display device; speakers; an optical drive; a storage device; a universal serial bus connection; any device connected to the computing device 201; any device communicating with the computing device 201; a printer; a scanner; or any other device or device described herein. [0050] The hardware layer 210 can further include physical memory 216 that can include any type of memory. In some embodiments, the physical memory 216 can include any memory type described herein. The physical memory 216 can store data, and in some embodiments can store one or more programs, or set of executable instructions. FIG. 2A illustrates one embodiment where firmware 212 is stored within the physical memory 216 of the computing device 201. Programs or executable instructions stored in the physical memory 216 can be executed by the one or more processors 208 of the computing device 201.

Firmware 212, in some embodiments, can be any combination of executable instructions and hardware that controls hardware communicating with or included within the computing device 201. In some embodiments, the firmware 212 can control one or more pieces of hardware within the hardware layer 210. Firmware 212, in many embodiments, can be executed by one or more processors 208 within the computing device 201. In some embodiments, the firmware 212 can be boot firmware such as the basic input/output system (BIOS.) Additional firmware 212 executing on the computing device 201 can interface with the BIOS.

In one embodiment, the computing device 201 can include an operating system 214 executed by one or more physical processors 208. In some embodiments, the operating system 214 is a user operating system that can directly access the hardware devices in the hardware layer 210. The operating system 214 can be any operating system and in some embodiments, the operating system 214 can be any operating system described herein. FIG. 2A illustrates one embodiment where the hypervisor 202 executes within the context of the operating system 214 executing on the computing device 201. In this embodiment, the operating system 214 can be referred to as a host operating system 214, while the other operating systems can be referred to as guest operating systems. Guest operating systems can include the guest operating systems 230A-B executing on the virtual machines 232, and/or the control program 220.

In some embodiments, the computing device 201 can include a hypervisor 202. A hypervisor 202, in some embodiments, can be a program that executed by processors 208 on the computing device 201 to manage any number of virtual machines. The hypervisor 202 can be referred to as a virtual machine monitor, or platform virtualization software. In some embodiments, a hypervisor 202 can be any combination of executable instructions and hardware that monitors virtual machines executing on a computing machine. While FIG. 2A illustrates a virtualization environment that includes a Type 2 hypervisor 202, the computing device 201 can execute any other type of hypervisor. For example, the computing device 201 can execute a virtualization environment that includes a Type 1 hypervisor 202. In some embodiments, the computing device 201 can execute one or more hypervisors 202. These one or more hypervisors 202 can be the same type of hypervisor, or in other embodiments can be different hypervisor types.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices; physical disks; physical processors; physical memory 216 and any other component included in the computing device 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the computing device 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 201 executes a hypervisor 202 that creates a virtual machine platform on which guest operating systems may execute. In these embodiments, the computing device 201 can be referred to as a host server. An example of such a computing device is the XEN SERVER provided by Citrix Systems, Inc., of Fort Lauderdale, Fla.

In one embodiment, the hypervisor 202 can create a virtual machine 232A-B (generally 232) in which an operating system 230 executes. In one of these embodiments, for example, the hypervisor 202 loads a virtual machine image to create a virtual machine 232. In another of these embodiments, the hypervisor 202 executes an operating system 230 within the virtual machine 232. In still another of these embodiments, the virtual machine 232 executes an operating system 230.

In one embodiment, the hypervisor 202 controls the execution of at least one virtual machine 232. In another embodiment, the hypervisor 202 presents at least one virtual machine 232 with an abstraction of at least one hardware resource provided by the computing device 201. The abstraction can further be referred to as a virtualization or virtual view of the hardware, memory processor and other system resources available on the computing device 201. Hardware or hardware resources, in some embodiments, can be any hardware resource available within the hardware layer 210. In other embodiments, the hypervisor 202 controls the manner in which virtual machines 232 access the physical processors 208 available in the computing device 201. Controlling access to the physical processors 208 can include determining whether a virtual machine 232 should have access to a processor 208, and how physical processor capabilities are presented to the virtual machine 232.

In some embodiments, the computing device 201 can host or execute one or more virtual machines 232. A virtual machine 232 can be called a domain, a guest and/or a DOMAIN U. A virtual machine 232 is a set of executable instructions that, when executed by a processor 208, imitate the operation of a physical computer such that the virtual machine 232 can execute programs and processes much like a physical computing device. While FIG. 2A illustrates an embodiment where a computing device 201 hosts three virtual machines 232, in other embodiments the computing device 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. The hypervisor 202, in other embodiments, provides each virtual machine 232 with a substantially similar virtual view of the physical hardware, memory, processor and other system resources available to the virtual machines 232.

Each virtual machine 232 can include a virtual disk 226A-C (generally 226) and a virtual processor 228A-C (generally 228.) The virtual disk 226, in some embodiments, is a virtualized view of one or more physical disks 204 of the computing device 201, or a portion of one or more physical disks 204 of the computing device 201. The virtualized view of the physical disks 204 can be generated, provided and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the computing device 201. In some embodiments, the virtualized view of the physical processors 208 can be generated, provided and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

A control program 220 may execute at least one application for managing and configuring the guest operating systems executing on the virtual machines 232 and in some embodiments the computing device 201. In some embodiments, the control program 220 can be called a control operating system, a control domain, domain 0 or dom 0. The control program 220, in some embodiments, can be DOMAIN o or DOM0 of the XEN hypervisor. The control program 220 can execute an administrative application or program that can further display a user interface which administrators can use to access the functionality of each virtual machine 232 and/or to manage the virtual machines 232. In some embodiments, the user interface generated by the administrative program can be used to terminate the execution of virtual machines 232, allocate resources to virtual machines 232, assign permissions to virtual machines 232, or manage security credentials associated with virtual machines 232. The control program 220, in some embodiments, can start new virtual machines 232 or terminate execution of executing virtual machines 232. In other embodiments, the control program 220 can directly access hardware and/or resources within the hardware layer 210. In still another embodiment, the control program 220 can interface with programs and applications executing on the computing device 210 and outside of the context of a virtual machine 232. Similarly, the control program 220 can interface with programs and applications executing within the context of a virtual machine 232.

In one embodiment, the hypervisor 202 can execute the control program 220 within a virtual machine 232. The hypervisor 202 can create and start the virtual machine 232. In embodiments where the hypervisor 202 executes the control program 220 within a virtual machine 232, that virtual machine 232 can be referred to as the control virtual machine 232. In still another embodiment, the control program 220 executes within a virtual machine 232 that is authorized to directly access physical resources on the computing device 201.

In some embodiments, a control program 220A (Not Shown) on a first computing device 201A (Not Shown) may exchange data with a control program 220B (Not Shown) on a second computing device 201B (Not Shown). In these embodiments the first computing device 201A may be located remote from the second computing device 201B. The control programs 220A-B can exchange data via a communication link between a hypervisor 202A (Not Shown) executing on the first computing device 201A and a hypervisor 202B (Not Shown) executing on the second computing device 201B. Through this communication link, the computing devices 201A-B can exchange data regarding processors and other physical resources available in a pool of resources. Further, through this connection between hypervisors 202A-B, the hypervisors 202A-B can manage a pool of resources, e.g. the resources available on the first computing device 201A and the second computing device 201B, distributed across one or more computing devices 201A-B. The hypervisors 202A-B can further virtualize these resources and make them available to virtual machines 232 executing on the computing devices 201A-B. In another instance of this embodiment, a single hypervisor 202 can manage and control virtual machines 232 executing on both computing devices 201A-B.

In some embodiments, the control program 220 interacts with one or more guest operating systems 230A-B (generally 230.) The control program 220 can communicate with the guest operating systems 230 through a hypervisor 202. Through the hypervisor 202, the guest operating system 230 can request access to physical disks 204, physical processors 208, memory 216, physical devices 206 and any other component in the hardware layer 210. In still other embodiments, the guest operating systems 230 can communicate with the control program 220 via a communication channel established by the hypervisor 202, such as, for example, via a plurality of shared memory pages made available by the hypervisor 202.

In some embodiments, the control program 220 includes a network back-end driver for communicating directly with networking hardware provided by the computing device 201. In one of these embodiments, the network back-end driver processes at least one virtual machine request from at least one guest operating system 230. In other embodiments, the control program 220 includes a block back-end driver for communicating with a storage element on the computing device 201. In one of these embodiments, the block back-end driver reads and writes data from the storage element based upon at least one request received from a guest operating system 230.

In another embodiment, the control program 220 includes a tools stack 224. In another embodiment, a tools stack 224 provides functionality for interacting with the hypervisor 202, communicating with other control programs 220 (for example, on a second computing device 201B), or managing virtual machines 232 on the computing device 201. In another embodiment, the tools stack 224 includes customized applications for providing improved management functionality to an administrator of a virtual machine farm. In some embodiments, at least one of the tools stack 224 and the control program 220 include a management API that provides an interface for remotely configuring and controlling virtual machines 232 running on a computing device 201. In other embodiments, the control program 220 communicates with the hypervisor 202 through the tools stack 224.

In one embodiment, the hypervisor 202 executes a guest operating system 230 within a virtual machine 232 created by the hypervisor 202. In another embodiment, the guest operating system 230 provides a user of the computing device 201 with access to resources within a computing environment. In still another embodiment, a resource includes a program, an application, a document, a file, a plurality of applications, a plurality of files, an executable program file, a desktop environment, a computing environment, or other resource made available to a user of the computing device 201. In yet another embodiment, the resource may be delivered to the computing device 201 via a plurality of access methods including, but not limited to, conventional installation directly on the computing device 201, delivery to the computing device 201 via a method for application streaming, delivery to the computing device 201 of output data generated by an execution of the resource on a second computing device 201' and communicated to the computing device 201 via a presentation layer protocol, delivery to the computing device 201 of output data generated by an execution of the resource via a virtual machine executing on a second computing device 201', or execution from a removable storage device connected to the computing device 201, such as a USB device, or via a virtual machine executing on the computing device 201 and generating output data. In some embodiments, the computing device 201 transmits output data generated by the execution of the resource to another computing device 201'.

In one embodiment, the guest operating system 230, in conjunction with the virtual machine on which it executes, forms a fully-virtualized virtual machine that is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 202. In such an embodiment, the driver is typically aware that it executes within a virtualized environment.

In another embodiment, the guest operating system 230, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control program 220, as described above.

Figure 2B:
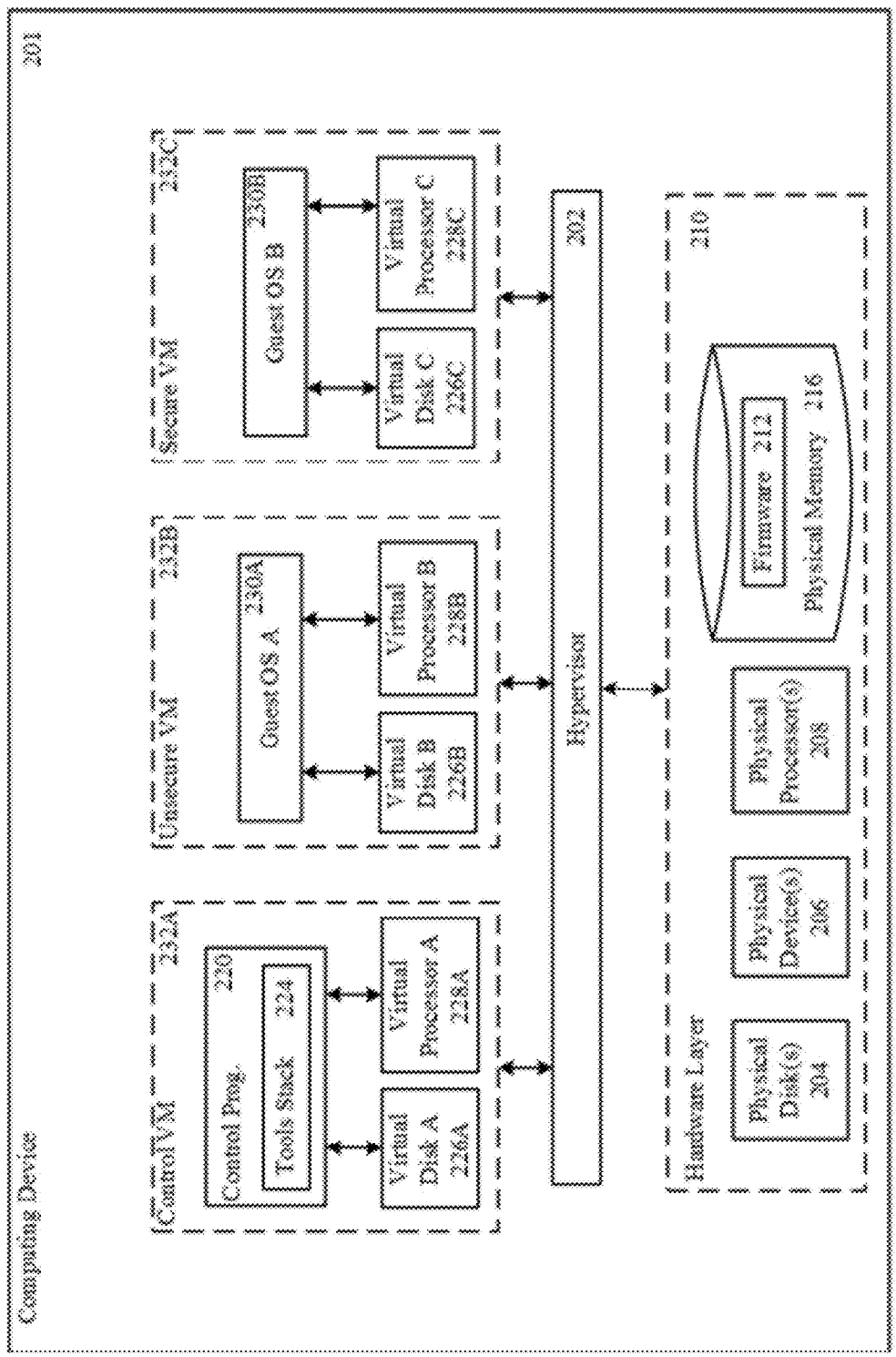

Illustrated in FIG. 2B is another embodiment of a virtualization environment that illustrates a Type 1 hypervisor 202. Executing on the computing device 201 is a hypervisor 202 that can directly access the hardware and resources within the hardware layer 210. Virtual machines 232 managed by the hypervisor 202 can be an unsecure virtual machine 232B and/or a secure virtual machine 232C. Whereas the virtualization environment depicted in FIG. 2A illustrates a host operating system 214, the virtualization environment embodiment in FIG. 2B does not execute a host operating system.

Further referring to FIG. 2B, and in more detail, the virtualization environment includes a Type 1 hypervisor 202. Type 1 hypervisors 202, in some embodiments, execute on "bare metal," such that the hypervisor 202 has direct access to all applications and processes executing on the computing device 201, all resources on the computing device 201 and all hardware on the computing device 201 or communicating with the computing device 201. While a Type 2 hypervisor 202 accesses system resources through a host operating system 214, a Type 1 hypervisor 202 can directly access all system resources. The Type 1 hypervisor 202 can execute directly on one or more physical processors of the computing device 201, and can include program data stored in the physical memory 216.

In a virtualization environment that employs a Type 1 hypervisor 202 configuration, the host operating system can be executed by one or more virtual machines 232. Thus, a user of the computing device 201 can designate one or more virtual machines 232 as the user's personal machine. This virtual machine can imitate the host operating system by allowing a user to interact with the computing device 201 in substantially the same manner that the user would interact with the computing device 201 via a host operating system 214.

Virtual machines 232 can be unsecure virtual machines 232B and secure virtual machine 232C. While FIG. 2B illustrates a secure and unsecure virtual machine, sometimes they can be referred to as privileged and unprivileged virtual machines. In some embodiments, a virtual machine's security can be determined based on a comparison of the virtual machine to other virtual machines executing within the same virtualization environment. For example, were a first virtual machine to have access to a pool of resources, and a second virtual machine not to have access to the same pool of resources; the second virtual machine could be considered an unsecure virtual machine 232B while the first virtual machine could be considered a secure virtual machine 232A. In some embodiments, a virtual machine's 323 ability to access one or more system resources can be configured using a configuration interface generated by either the control program 220 or the hypervisor 202. In other embodiments, the level of access afforded to a virtual machine 232 can be the result of a review of any of the following sets of criteria: the user accessing the virtual machine; one or more applications executing on the virtual machine; the virtual machine identifier; a risk level assigned to the virtual machine based on one or more factors; or any other similar criteria.

In some embodiments, unsecure virtual machines 232B may be prevented from accessing resources, hardware, memory locations, and programs that secure virtual machines 232A may access. For example, a secure virtual machine 232C may be able to access one or more company resources, while the unsecure virtual machine 232B cannot access any company resources.

Illustrative Systems and Methods for Capacity Estimation.

Figure 3:
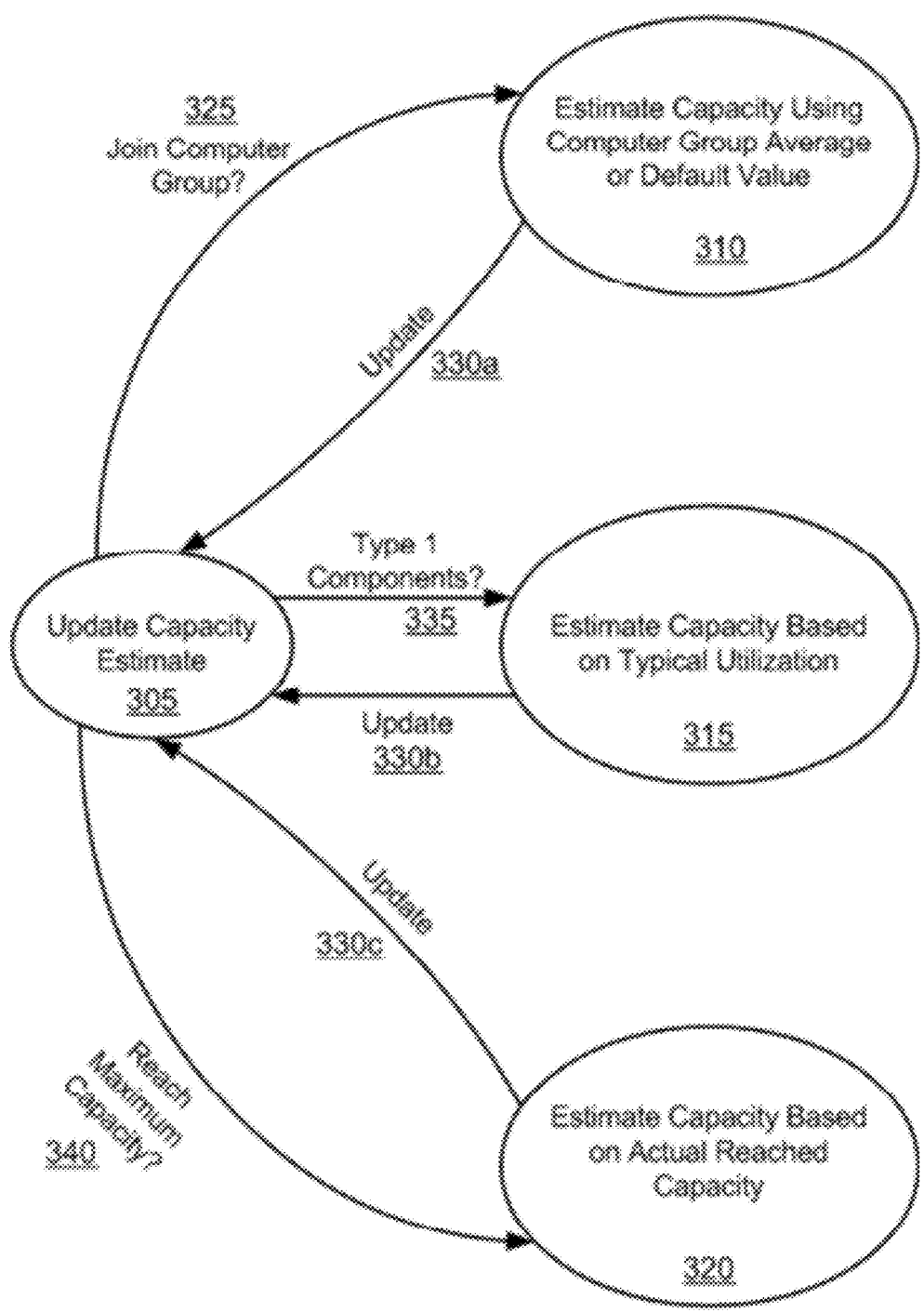
FIG. 3 is a block diagram of a method for estimating capacity.
Figure 4A:
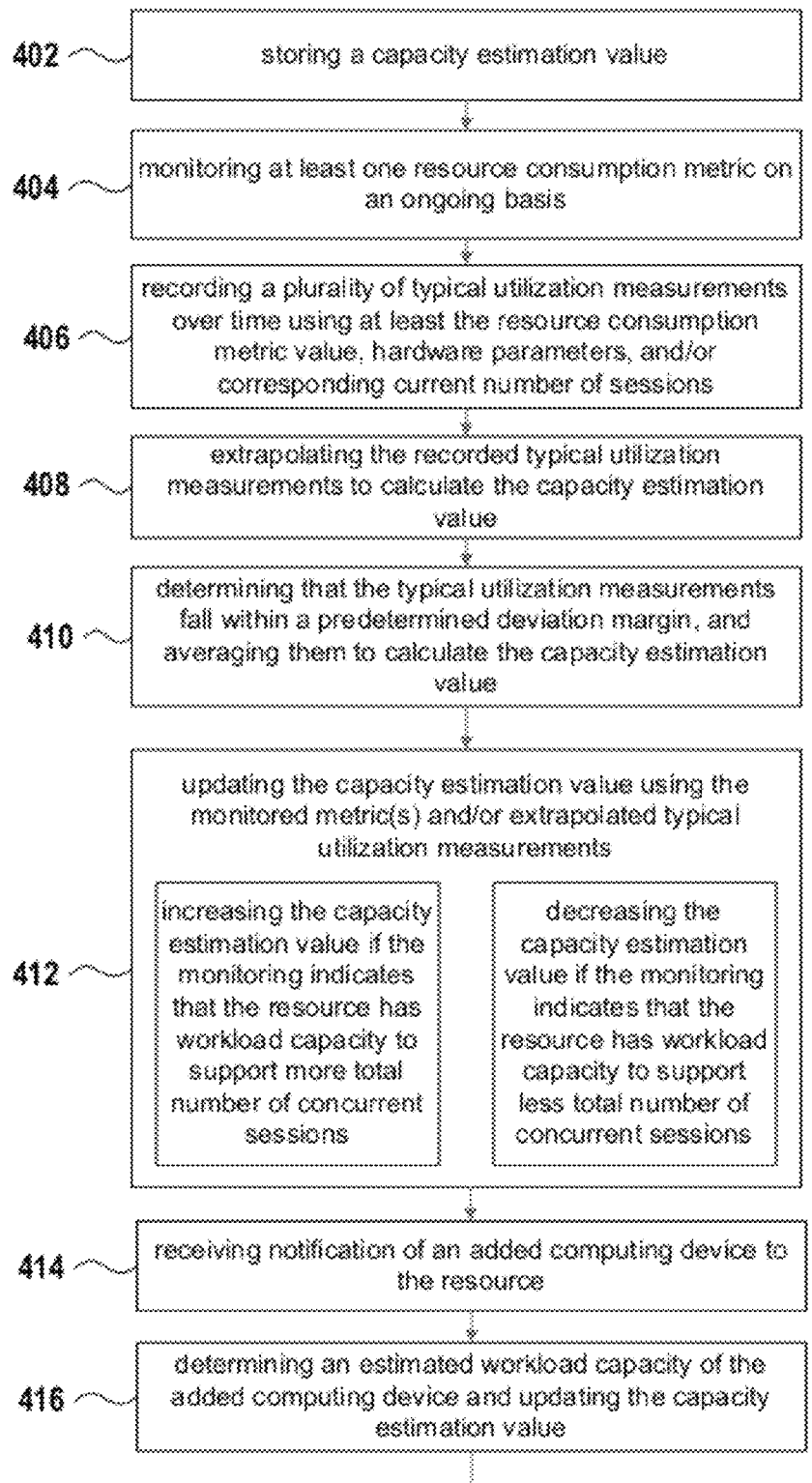
FIG. 4A and FIG. 4B are flowcharts illustrating a computer-assisted method in accordance with various aspects of the disclosure.
Figure 4B:
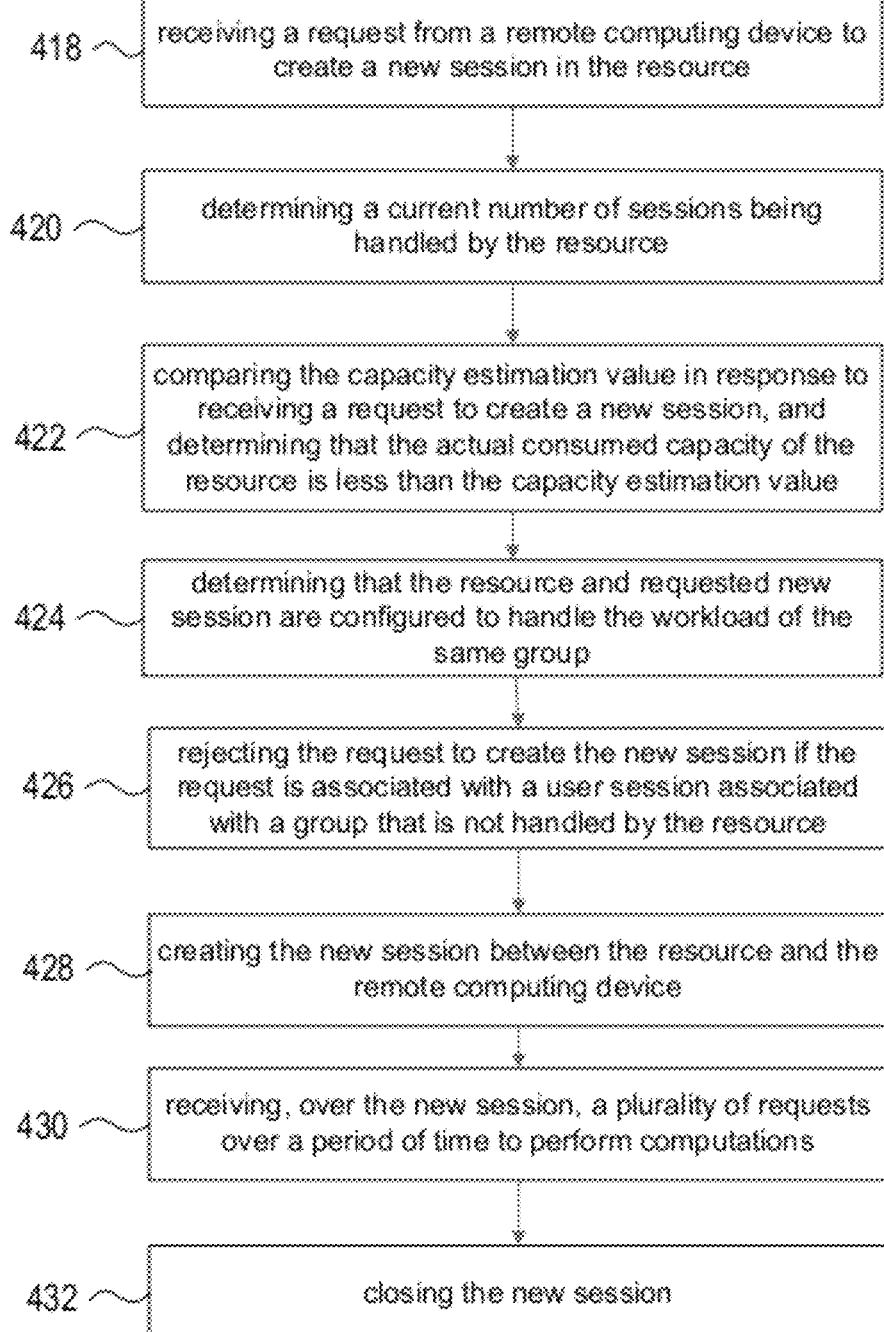

Illustrated in FIGS. 3, 4A, and 4B are flowcharts of the various methods for estimating and updating the capacity associated with the hardware and resources associated with a user-mobility boundary. A user-mobility-boundary component (hereinafter "UMB component") capacity estimate can be updated (step 305 & 402) by storing a capacity estimation value in a repository. The repository can exist within the UMB component or can exist on a computer or hardware element remotely located from the UMB component. In those embodiments, communication between the remote storage location and the UMB component can permit updates of the UMB component capacity estimate. When a UMB component is added to a computer group or other group of UMB components (Step 325 & 414), a notification may be received indicating a computing device (e.g., hardware or software) has been added to the pool of resources, and that a capacity estimator can make a capacity estimation (Step 310). Any changes to the estimation are used to update (Step 330a & 416) the UMB component capacity estimate value. When a UMB component includes Type 1 hardware/software components (Step 335), a capacity estimator can make another type of capacity estimation (Step 315) and can then update the UMB component capacity estimate value (Step 330b). When a UMB component has reached its maximum capacity (Step 340), the capacity estimator can make yet another type of capacity estimation (Step 320) and can then update the UMB component capacity estimate value (Step 330c).

Further referring to FIG. 3, and in more detail, in some embodiments a capacity estimator can estimate the capacity of a UMB component. This capacity estimator can be part of the UMB component. For example, if user sessions are restricted to a computer such that the computer is a user-mobility boundary, then the capacity estimator can execute on that computer or on another remotely located computer that can communicate with the computer that is a UMB component. In another example, if user sessions are restricted to a hypervisor pool such that the hypervisor pool is a user-mobility boundary, then the capacity estimator can execute on any computer executing all or a portion of the hypervisor pool. In other embodiments, the capacity estimator can execute on a computer remotely located from the computers and/or hardware executing the hypervisor pool.

A capacity estimator can store a capacity estimate value for any of the user sessions executing within a UMB component. The storage repository storing the capacity estimate value can be on or within the UMB component, or can be remotely located from the UMB component. In some embodiments, the capacity estimate value can be a number empirically determined based on bandwidth consumption, CPU (central processing unit) consumption, memory consumption, or any other resource consumption metric. In other embodiments, the capacity estimate value can be a percentage value representative of the percentage of total available resources on or within a UMB component. In still other embodiments, the capacity estimate value can be a matrix that includes any of the following values: CPU capacity; memory capacity; network bandwidth capacity; or any other resource capacity. The capacity estimate value, in one embodiment, can be an estimate of either how many user sessions a particular UMB component can handle, or an estimate of the percentage of UMB component capacity a particular user session will occupy or require.

Hardware or software components of a UMB component or system can be one of two types. The first type can be a hardware or software component where the metrics used to determine capacity or the hardware parameters can be converted to percentage values. For example, CPU and memory values can be converted to a percentage value such that the percentage value can be used to describe how much of that resource a user session accesses or otherwise uses. This type of hardware or software component can be referred to as a TYPE 1 component. The second type can be a hardware or software component where the metrics used to determine capacity or the hardware parameters cannot be converted to a percentage value. For example, storage and network bandwidth values cannot be converted to a percentage value, rather you must use alternative terms to describe how much of that resource a user session accesses or otherwise uses.

When a UMB component joins (Step 325) a group of computers or other UMB components, the capacity estimator can estimate the capacity of that component (Step 310). For example, when a hypervisor pool joins a group of hypervisor pools, notification is received of the added computational power to the resource (step 414). Also, the capacity estimator can estimate the capacity of the recently added hypervisor pool (step 416). Similarly, when a computer joins a server farm or other group of computers, the capacity estimator can estimate the capacity of the recently added computer.

Estimating the capacity of the recently added UMB component can be accomplished one of two ways. When there is an existing group of UMB components (e.g. group of computers or group of hypervisor pools), the capacity estimator can estimate capacity by using the current averages for the group of UMB components (step 410). The capacity estimator can then extrapolate these averages based on the hardware parameters of the recently added UMB components (see step 408). For example, the capacity estimator can use average CPU usage/user session for the UMB components included in a group as a baseline estimate for the amount of CPU resources a new user session may use. Using this baseline estimate, the capacity estimator can estimate approximately how many user sessions the newly added UMB component's CPU can handle.

When there are no other UMB components in the group, e.g. the group is a new group and the newly added UMB component is the initial component in the group, the capacity estimator can use a default capacity value. This default capacity value can be a value that emerges from an ongoing average of the capacity of typical workloads (step 410). For example, the capacity estimator may record over a period of time that a user session typically uses 0.02% of available CPU this heuristically determined value can be used as a default capacity estimation value when a group does not have a particular average.

The capacity estimation value can be updated (Step 330*a*-*c*) on a regular basis by the capacity estimator. As described above and below, the capacity estimation value can be updated when an event occurs, or on a periodic basis. Consequently, at least one resource consumption metric may be monitored on an ongoing basis (step 404). The update can include replacing the existing capacity estimation value with the new capacity estimation value, or the update can include a weighted or un-weighted average of the existing capacity estimation value and the new capacity estimation value (step 410). For example, the capacity estimator can update an existing capacity estimation value determined using the average of the UMB components in a group by replacing that estimation value with a capacity estimation value determined based on a typical load determined based on the actual load that a computer or UMB component can handle (step 406). Each time the capacity estimator estimates a new capacity estimation value, the capacity estimator can recalculate or replace the existing capacity estimation value.

In some embodiments, when the UMB component contains TYPE 1 components, the capacity estimator can estimate capacity based on typical utilization. Determining whether a UMB component contains TYPE 1 components (Step 335) can include searching for metadata that outlines the components or elements of a UMB component. Other embodiments include configuring the capacity estimator to estimate capacity based on typical utilization.

When a UMB component is capable of estimating typical utilization, the capacity estimator can estimate capacity based on the UMB component's actual utilization (Step 315). Actual utilization can be, in some embodiments, the typical utilization for a UMB component. A typical utilization can be defined in many ways. For example, for desktop virtualization, current utilization can be above thirty-three percent of maximum estimated capacity. Further, the number of atypical sessions, e.g. disconnected sessions for virtual desktops, can be below five percent. Still further, the amount of utilization of system resources, e.g. those resources not associated with user sessions, can be below five percent.

A typical load can be defined based on typical scenarios, not based on data collected during an atypical scenario (step 404). For example, a typical load would not be defined based on data collected during a maintenance operation. Data collected during such an event would likely skew the collected load metrics because the executed operations are not typical of normal operation of the UMB component.

Estimating capacity using typical utilization values can include considering and collecting TYPE 1 hardware parameters. The capacity estimator can determine the current utilization for a UMB component based on the usage percentage for each TYPE 1 component. Determining the usage percentage can include obtaining the hardware parameters and metrics for the TYPE 1 components, assuming that the current number of sessions can extrapolate linearly to one-hundred percent, and generating a capacity estimation (step 408 & 410). The capacity estimator can store the estimated value and a timestamp. When enough actual utilization metrics are generated, the capacity estimator can determine whether the gathered capacity estimations fall within a deviation margin. When it is determined that the estimations fall within a deviation margin, the capacity estimator can update the capacity estimate value (Step 330*b*) using an average of the gathered estimates (step 410).

When a UMB component reaches maximum capacity, e.g. the UMB component's resources are substantially completely utilized by user sessions or other processes and applications, another capacity estimation can be made. This capacity estimation can use the hardware and process metrics gathered when the UMB component reaches an actual maximum capacity to determine a capacity estimation value. In some embodiments, the capacity estimator updates the capacity estimate value (Step 330*c*) when measurements gathered when the UMB component reaches a maximum capacity fall within a deviation margin. (step 412).

In some embodiments, any of the above-mentioned capacity estimation methods can be executed at any point in time. For example, a new capacity estimation value can be determined when workload performance characteristics change. These characteristics can change when software updates are made or when new applications are introduced. In other embodiments, any similar trigger can cause the capacity estimator to calculate a new capacity estimation value.

Referring to FIG. 4B, when a request is received (step 418) from a remote computing device to create a new session in the resource, various checks may be performed. For example, the current number of sessions being handled by the resource at the present time may be determined (step 420). The capacity estimation value may be compared (step 422) against the actual consumed capacity of the resource to determine if sufficient capacity remains in the resource to open a new session. In addition, (step 424) the system may determine if the resource and the requested new session are configured to handle the workload of the same group. For example, if the requested new session is for particular types of users (e.g., accountants), then the resource may allow the new session only if it is also configured to accommodate those types of users. Different types of users may have different memory, CPU, bandwidth, and other resource consumption requirements and usages, and may have similar typical utilization measurements as other user types in its group. By identifying the type of user early in the session initiation process, the system may be better able to anticipate and handle the resource consumption associated with the new session. Thus, the system may provide a better experience to the sessions being handled by its resources. If the request is associated with a session associated with a group (e.g., type of user profile) that is not handled by the resource, then the request to create the new session may be rejected (step 426). One skilled in the art will appreciate after review of the entirety disclosed herein that one or more of the aforementioned checks may be optional, omitted, or performed in a different order.

In step 428, after the various checks have been completed, a new session may be created (step 428) between the resource and the remote computing device requesting the session. The resource consumption metrics of the resource may be monitored on an ongoing basis (step 404) and the capacity estimation value of the resource updated (step 412). The capacity estimation value may be increased if the monitoring indicates that the resource has workload capacity to support more total number of concurrent sessions, and decreased if the monitoring indicates that the resource has workload capacity to support less total number of concurrent sessions. The new session on the resource may, in some embodiments, be a long-lived session such that a plurality of requests may be received over the new session over a period of time (e.g., one day, many hours, many days) to perform computations or other processing. It is this long-lived characteristic of the session that makes especially desirable/beneficial the session capacity estimation of the disclosure. Once a session is created, the user mobility boundary (UMB) of the session becomes limited. Finally, in step 432 the session may be closed after the long-lived session has completed.

While certain exemplary embodiments have been described and shown in the accompanying drawings, it is to be understood that such embodiments are merely illustrative of and not restrictive on the methods and systems described herein. Additionally, it is possible to implement the methods and systems described herein or some of its features in hardware, programmable devices, firmware, software or a combination thereof. The methods and systems described herein or parts of the methods and systems described herein may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile). In addition, although method steps have been depicted in flowcharts in a particular order, the steps may be performed an order different than that shown, and one or more steps may be optional or omitted in accordance with various aspects of the disclosure.

I claim:

1. A method comprising:
    storing a capacity estimation value in computer memory, wherein the capacity estimation value estimates how many concurrent sessions a resource in a virtualized computing environment has workload capacity to handle;
    monitoring, by a processor, a plurality of resource consumption metrics of the resource on an ongoing basis, wherein the plurality of resource consumption metrics comprise a network bandwidth consumption metric, CPU consumption metric, and memory consumption metric;
    updating the capacity estimation value using the plurality of monitored resource consumption metrics;
    comparing, by the processor, the capacity estimation value in response to receiving a request to create a new session in the resource;
    receiving a hardware parameter of the resource and the plurality of resource consumption metric values of the resource;
    determining a current number of sessions being handled by the resource;
    recording, in computer memory, a plurality of utilization measurements over time using at least the resource consumption metric value and a corresponding current number of sessions;
    determining that the recorded measurements fall within a predetermined deviation margin;
    averaging the recorded measurements to calculate the capacity estimation value; and
    updating the capacity estimation value using the calculated capacity estimation value.

2. The method of claim 1, wherein updating the capacity estimation value includes:
    increasing the capacity estimation value if the monitoring indicates that the resource has workload capacity to support more total number of concurrent sessions, and
    decreasing the capacity estimation value if the monitoring indicates that the resource has workload capacity to support less total number of concurrent sessions.

3. The method of claim 1, comprising:
    receiving a hardware parameter of a TYPE 1 component included in the resource;
    receiving resource consumption metric value of a TYPE 1 component included in the resource;
    determining a current number of sessions being handled by the resource;
    recording, in computer memory, a plurality of utilization measurements over time using at least the resource consumption metric value and the corresponding current number of sessions;
    extrapolating the recorded utilization measurements to calculate the capacity estimation value; and
    updating the capacity estimation value with the calculated value.

4. The method of claim 3, comprising:
    determining that the utilization measurements fall within a predetermined deviation margin, before the updating of the capacity estimation value.

5. The method of claim 1, comprising:
    receiving notification of an added computing device to the resource in the virtualized computing environment;
    determining an estimated workload capacity of the added computing device;
    updating the capacity estimation value using the estimated workload capacity of the added computing device.

6. The method of claim 5, wherein the estimated workload capacity of the added computing device is calculated using a current average for the resource extrapolated based on the added computing device's hardware parameter.

7. The method of claim 5, wherein the updating the capacity estimation value after the determining the estimated workload capacity of the added computing device comprises:
    Calculating a weighted average of the initial capacity estimation value and the updated capacity estimation value; and
    updating the capacity estimation value with the calculated weighted average.

8. The method of claim 1, wherein the resource includes TYPE 1 and TYPE 2 components, and a first monitored resource consumption metric corresponds to a TYPE 1 component and a second monitored resource consumption metric corresponds to a TYPE 2 component.

9. The method of claim 1, wherein the new session is a long-lived session.

10. The method of claim 1, comprising:
    receiving a request from a remote computing device to create the new session in the resource in the virtualized computing environment;
    determining that an actual consumed capacity of the resource in the virtualized computing environment is less than the capacity estimation value for the resource; and creating the new session between the resource in the virtualized computing environment and the remote computing device;

receiving a plurality of requests over the new session to perform computations over a period of time; and closing the new session.

11. The method of claim 1, comprising:

before the requested new session is created, determining that the resource in the virtualized computing environment and the requested new session are configured to handle the workload of a first group, wherein the first group comprises user sessions with similar utilization measurements.

12. The method of claim 1, comprising:

rejecting the received request to create the new session if the request is associated with a user session associated with a group that is not handled by the resource in the virtualized computing environment; and rejecting the received request to create the new session if the comparing indicates that the capacity estimation would be exceeded.

13. An apparatus, comprising:

at least one processor configured to execute computer-executable instructions; and at least one memory storing the computer-executable instructions, which when executed by the processor, cause the apparatus to:

store a capacity estimation value, wherein the capacity estimation value estimates workload capacity of a resource in a virtualized computing environment;

monitor a plurality of resource consumption metrics of the resource on an ongoing basis, wherein the plurality of resource consumption metrics comprise a network bandwidth consumption metric, CPU consumption metric, and memory consumption metric;

update the capacity estimation value using the plurality of monitored resource consumption metrics;

compare the capacity estimation value in response to receiving a request to create a new session in the resource;

reject the received request to create the new session if the comparing indicates that the capacity estimation would be exceeded;

receive a hardware parameter of the resource and the plurality of resource consumption metric values of the resource;

determine a current number of sessions being handled by the resource;

record a plurality of utilization measurements over time using at least the resource consumption metric value and a corresponding current number of sessions;

determine that the recorded measurements fall within a predetermined deviation margin;

average the recorded measurements to calculate the capacity estimation value; and update the capacity estimation value using the calculated capacity estimation value.

14. The apparatus of claim 13, wherein the new session is a long-lived session.

15. The apparatus of claim 13, wherein the virtualized computing environment comprises a hypervisor, a plurality of virtual machines, and a control program.

16. The apparatus of claim 13, wherein the memory further stores computer-executable instructions, which when executed by the processor, cause the apparatus to:

before creating requested new session, determine that the resource in the virtualized computing environment and the requested new session are configured to handle the workload of a first group, wherein the first group comprises user sessions with similar typical utilization measurements; and reject the received request to create the new session if the request is not associated with a user session associated with the first group.

17. A method comprising:

storing a capacity estimation value in computer memory, wherein the capacity estimation value estimates workload capacity of a resource in a virtualized computing environment;

monitoring, by a processor, at least one resource consumption metric of the resource on an ongoing basis, wherein the at least one resource consumption metric comprises CPU consumption metric;

updating the capacity estimation value using the monitored at least one resource consumption metric;

comparing, by the processor, the capacity estimation value in response to receiving a request to create a new session in the resource;

receiving notification of an added computing device to the resource in the virtualized computing environment;

determining an estimated workload capacity of the added computing device; and updating the capacity estimation value using the estimated workload capacity of the added computing device, comprising:

calculating a weighted average of an initial capacity estimation value and the updated capacity estimation value; and updating the capacity estimation value with the calculated weighted average.

18. The method of claim 17, wherein the at least one resource consumption metric further comprises a network bandwidth consumption metric and memory consumption metric, and the method further comprising:

rejecting the received request to create the new session if the request is associated with a user session associated with a group that is not handled by the resource in the virtualized computing environment; and rejecting the received request to create the new session if the comparing indicates that the capacity estimation would be exceeded.

19. An apparatus, comprising:

at least one processor configured to execute computer-executable instructions; and at least one memory storing the computer-executable instructions that, when executed by the at least one processor, cause the apparatus to:

store a capacity estimation value in the at least one memory, wherein the capacity estimation value estimates workload capacity of a resource in a virtualized computing environment;

monitor at least one resource consumption metric of the resource on a periodic basis, wherein the at least one resource consumption metric comprises CPU consumption metric;

update the capacity estimation value using the monitored at least one resource consumption metric;

receive notification of an added computing device to the resource in the virtualized computing environment;

determine an estimated workload capacity of the added computing device;

calculate a weighted average of an initial capacity estimation value and the capacity estimation value updated using the estimated workload capacity of the added computing device; and update the capacity estimation value with the calculated weighted average.

* * * * *